Patented Sept. 1, 1925.

1,551,878

UNITED STATES PATENT OFFICE.

ALBERT HERMANN, OF RHEINFELDEN, GERMANY.

PROCESS FOR PRODUCING COMPOSITIONS FOR PURIFYING ACETYLENE AND OTHER GASES.

No Drawing.     Application filed May 8, 1925.  Serial No. 28,977.

*To all whom it may concern:*

Be it known that I, ALBERT HERMANN, a citizen of Germany, and residing at Rheinfelden, Germany, have invented certain new and useful Improvements in Processes for Producing Compositions for Purifying Acetylene and Other Gases, of which the following is a specification.

This invention relates to the production of compounds for purifying acetylene and other gases. Compositions of this kind are known which are produced by adding slaked lime or calcium carbonate with or without the addition of calcium chloride to a paste of bleaching powder and water in such a quantity that, through drying, a solid and porous product is obtained. The purifying compounds thus produced contain about 15 per cent, at the highest, of active chlorine, but at the same time a quantity of calcium chloride equivalent, at least, to their percentage of active chlorine, whereby these compounds become hygroscopic in an undesired manner. It was generally believed that stronger concentrations in the form of bleaching powder, could not be employed, because of the danger of explosions, which danger results from the considerable tension of chlorine in strong bleaching powder which may cause partial chlorination of the gas connected with an increase of temperature and subsequent explosion.

The object of the present invention is to produce a compound of the kind described, containing, at least, the double percentage of active chlorine without involving any risk of explosion or the like. I have found that the basic calcium and magnesium hypochlorite compounds practically free from chloride, which have lately become known and which are very durable in themselves, may be very advantageously employed for making purifying compounds, as the active chlorine contained therein does not act in the form of this element but, even at higher temperatures, solely in the form of oxygen. For moulding these substances only small additions of agglutinants are required. Preferably the dry basic hypochlorites or those still moist from making, are stirred together with the agglutinant and water. If desired, the products may be dried by applying heat to them with or without the use of a vacuum. Plaster of Paris or Portland cement may be used as agglutinants, but other substances proof against hypochlorites may be employed.

Furthermore I have found it advantageous to produce the required high porosity by adding substances which themselves or in cooperation with the inert components of the mixture split off gases even at ordinary temperature. For this purpose light metals such as magnesium, aluminum or their alloys have proved, suitable. They may be mixed in the form of a powder with the paste of the hypochlorite and the agglutinant. The metals develop hydrogen in the alkaline, warm and moist medium and thereby make the paste less compact in a very regular manner, without reducing its percentage of active chlorine. The percentage of the metals to be added is very small. For instance 0.1 per cent of powdered magnesium suffices to obtain a highly porous mass.

The degree of porosity may be adjusted at will. Additions which would develop gases with the consumption of active chlorine, such as ammonia or peroxides, are less serviceable.

The porous purifiers thus obtained may be dried, owing to the stability of the hypochlorites used, almost without any loss of active chlorine. The final product is not hygroscopic, in contradistinction to the hygroscopic purifiers hitherto produced by means of bleaching powder, the pores of which, as experience has shown, are rapidly obstructed by the absorption of water from the gases to be purified.

The products obtained according to my invention contain 30 to 40 per cent of active chlorine. They are most efficacious, and afford considerable advantages inasmuch as a container of a given size filled with my improved mass, will suffice for a far longer time than the same container filled with the mass hitherto used, whereby much work in charging and emptying the containers is saved, and the purifier plant is capable of sustaining a far stronger load, owing to the stability of the basis hypochlorites against the action of heat.

I claim:—

1. Process for producing purifying compounds for acetylene and other gases, consisting in mixing basic hypochlorite compounds practically free from chloride with an agglutinant and water and allowing the mixture to set.

2. Process according to claim 1, comprising the addition of a substance capable of producing pores in the mixture before it sets.

3. Process according to claim 1 comprising the addition of a substance capable of developing gases in an alkaline medium, before the mixture sets.

4. Process according to claim 1, comprising the addition of a finely distributed metal capable of developing gas in contact with the mixture before it sets.

5. Process according to claim 1, comprising the addition of powdered aluminum before the mixture sets.

6. As an article of manufacture and trade, a composition consisting of a set mixture of a basic hypochlorite compound, an agglutinant and water.

7. As an article of manufacture and trade, a porous composition consisting of a set mixture of a basic hypochlorite compound, an agglutinant and water.

In testimony whereof I affix my signature.

ALBERT HERMANN.